(12) United States Patent
Lamparter

(10) Patent No.: US 6,807,607 B1
(45) Date of Patent: Oct. 19, 2004

(54) CACHE MEMORY MANAGEMENT SYSTEM AND METHOD

(75) Inventor: Bernd Lamparter, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 09/580,856

(22) Filed: May 30, 2000

(30) Foreign Application Priority Data

Aug. 17, 1999 (EP) .............................................. 99116242

(51) Int. Cl.[7] .............................................. G06F 12/12
(52) U.S. Cl. ...................................... 711/133
(58) Field of Search ................................. 711/133, 134, 711/135, 136

(56) References Cited

U.S. PATENT DOCUMENTS

| | | | | |
|---|---|---|---|---|
| 5,546,559 A | * | 8/1996 | Kyushima et al. ........... | 711/133 |
| 5,608,890 A | * | 3/1997 | Berger et al. ............... | 711/113 |
| 5,787,473 A | * | 7/1998 | Vishlitzky et al. .......... | 711/134 |
| 5,892,937 A | * | 4/1999 | Caccavale .................... | 711/135 |
| 6,219,760 B1 | * | 4/2001 | McMinn ..................... | 711/118 |

* cited by examiner

*Primary Examiner*—Matthew D. Anderson
(74) *Attorney, Agent, or Firm*—Gerald R. Woods

(57) ABSTRACT

Decisions to remove objects from a cache memory are made on an object-by-object basis. When a cache replacement decision is called for, a single object is selected from the cache. A weight value is assigned to the selected object in accordance with a predetermined methodology. The assigned object weight is compared to a current threshold weight. If the assigned object weight is the lesser of the two weights, the selected object is marked for removal from the cache and the threshold weight is reduced. If the assigned object weight is the greater of the two, the threshold weight is raised. In a preferred embodiment, the threshold weight is lowered more quickly than it is raised. The technique can be used in standalone workstations and in proxy servers, among other environments.

9 Claims, 2 Drawing Sheets

CACHE MEMORY MANAGEMENT SYSTEM AND METHOD

FIELD OF THE INVENTION

The present invention relates cache memory management and more particularly to a simple technique for deciding whether or not to remove an object from cache storage.

BACKGROUND OF THE INVENTION

Cache memories are relatively small buffer memories used in computer systems to provide temporary storage for data retrieved from larger, slower main memory devices, such as hard disk drives. Cache memories, if properly managed, can significantly improve computer system performance.

Cache memories are employed in many computer workstations. A central processing unit in a workstation needs less time to obtain data from a cache memory than it does to obtain the same data by accessing the main memory. If a reasonable percentage of the data needed by a central processing unit is maintained in cache memory, the amount of processor time wasted waiting for data to be retrieved from main memory is significantly reduced, improving the computer system performance.

Cache memories are also employed in network environments, exemplified by the Internet or World Wide Web. In a Web environment, a user (interacting through a personal computer) communicates with a Web host through a proxy server. One of the functions that a proxy server performs is caching of copies of data previously requested by the user. When the user submits a request for data, a proxy server intercepts that request and determines whether it has already cached a copy of the requested data. If a cached copy exists, that copy is returned to the user by the proxy server without ever forwarding request to the Web host. If a cached copy does not exist in the proxy server, the server then forwards the user's request to the Web host. When the Web host returns the requested data, the proxy server attempts to cache a copy of the data before passing it on to the user.

If the requested data unit or object is found in the cache, this is called a "hit". If the object cannot be found in the cache, this is called a "miss" necessitating a "fetch" operation to retrieve the memory from the Web host.

In steady-state system operation, the cache becomes heavily loaded. A cache miss requires a fetch operation and also implies that some of the data already in the cache must be removed to make room for the data being fetched from main memory. Cache replacement techniques have been studied extensively. Use-based replacement techniques take into account the record of use for every cached object when making replacement decisions. Examples of this type of replacement technique are the "Least Recently Used" (LRU) approach or the "working set" approach. Other approaches make removal/replacement decisions on the basis of factors unrelated to usage. A "first-in-first-out" or FIFO approach and a "random removal" approach are examples of cache replacement techniques which do not take into account object usage.

Cache replacement techniques can place heavy demands on system resources. One known class of techniques requires that a number of cached objects be "ranked" relative to one another to determine which object would be the "best" one to remove. To make sure that cache replacement decisions can be made quickly enough, systems practicing "ranking" techniques are typically implemented at least in part in hardware. Hardware implementations are costlier and less flexible than software implementations.

A similar situation is found for cache systems used in proxy servers. Once its cache is full, the proxy server must remove cached objects, also called documents, in order to free up space for newly received documents. In a network environment, cache replacement operations are sometimes referred to as garbage collection.

A proxy server is typically capable of storing large numbers of documents. Because of this, it is not always practical to use "ranking" techniques in making cache replacement decisions. For this reason, garbage collection is sometimes performed at a certain time of day or is triggered only when the cache size exceeds a given limit.

Where large numbers of documents are stored, a proxy server may select a subset of the documents and assign a weight to each document in the subset. The weight may be based on an estimation of the probability that the particular document will be needed in the future. Once all the documents in the subset are assigned a weight, the documents are ranked relative to one another. A predetermined percentage of the documents is removed from the subset. One problem with this approach is trying to choose the size of the subset. If the subset is too small, it may not be statistically representative of the entire set. Removing a predetermined percentage of the documents in the subset may result in the removal of documents that ranked low in the subset but would have ranked relatively higher if the complete set of documents had been ranked. Making the subset larger is not complete solution since larger subsets increase computational demands on the system.

SUMMARY OF THE INVENTION

The present invention is a cache replacement technique that minimizes demands on system resources. When a cache replacement decision is to be made, an object is selected from the cache and assigned a weight in accordance with a predetermined methodology. The assigned object weight is compared to an existing threshold. If the assigned object weight is lower than the threshold, the object is marked for removal and the threshold value is reduced. If the assigned object weight is higher than the threshold, the object remains in the cache and the threshold level is raised. A reduction in the threshold level decreases the chances that the next object considered will be selected for replacement. An increase in the threshold level increases the chances that the next object considered will be selected for replacement.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

The present invention can be realized in hardware, software, or a combination of hardware and software. Any kind of computer system or other apparatus adapted for carrying out the techniques described herein is suited. A typical combination of hardware and software could be a general-purpose computer system with a computer program that, when loaded and executed, causes the computer system to carry out the methods described herein. The present invention can also be embedded in a computer program product capable, when loaded into a computer system, of carrying out the described methods.

Computer program means or computer program in the present context means any expression in any language, coding notation, of the set of instructions intended to cause a system having an information processing capability to perform a particular function either directly or after either or both of the following: conversion to a different language, coding or notation or reproduction in a different material form.

Figure 1:
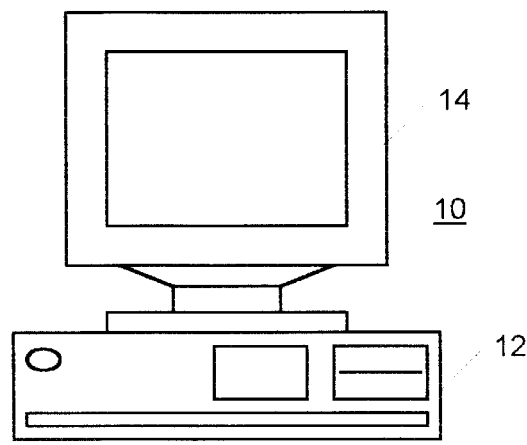
FIG. 1 is a schematic representation of a workstation in which the present invention may be implemented.

FIG. 1 is a schematic representation of a typical workstation 10 that might be used in conducting cache management at a workstation level. The major components of the workstation would be a system unit 12 and a display 14.

Figure 2:
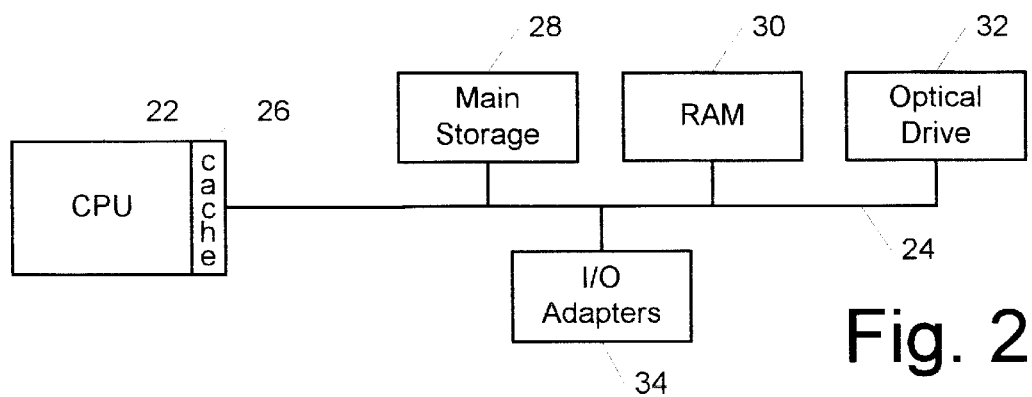
FIG. 2 is a block diagram of primary functional components of the workstation.

FIG. 2 is a block diagram of typical major functional components of the system unit 12. The system unit 12 includes a central processing unit or CPU 22 connected to a system bus 24 through cache memory 26. A primary or main storage device 28, such as a hard disk drive, is connected to the CPU as is random access memory 30 and an optical drive 32 implementing one of several known optical technologies such as CD-R, CD-RW and DVD technologies. The system unit 12 also includes input/output (I/O) adapters 34 which provide interfaces to such components as a keyboard and a mouse (neither of which shown) and the display 14. The depiction of the components is highly functional. The actual physical connections between the components would be more complex. For example, the main storage device 28 and the cache storage 26 would probably be connected through separate data lines rather than through system bus 24. Details of the physical connections between components are not needed for an understanding of the present invention.

Figure 3:
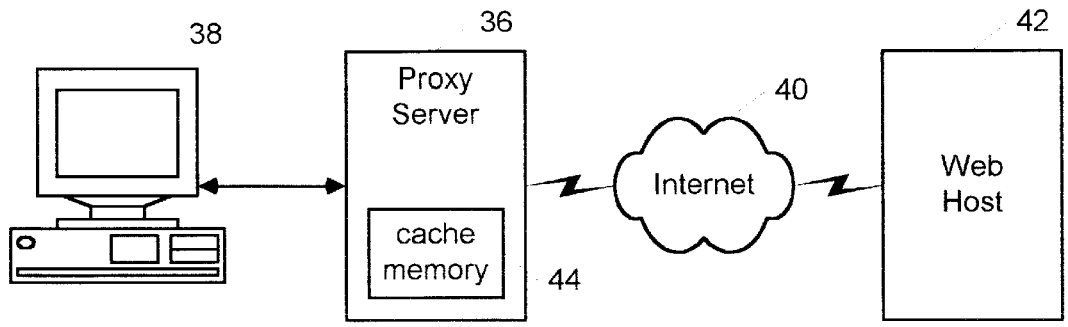
FIG. 3 is a schematic representation of a network including a proxy server in which the present invention may be implemented.

While the invention can be implemented in a standalone workstation of the type described, the following material describes the invention in the context of a proxy server such as proxy server 36 shown in FIG. 3. The description of the invention in this context should not be construed as a limitation on the described cache replacement technique, which can be utilized in other types of computer systems, including the standalone workstation already described with reference to FIGS. 1 and 2. The proxy server 36 serves as a gateway between a user terminal 38 and a wide area network 40, identified as the Internet, leading to a Web host 42. The proxy server 36 also includes a cache memory unit 44 which can be used to store documents or other data which the proxy server has retrieved from the Web host 42 in response to requests made at user terminal 38.

The specification uses the terms "object" or "document" to refer to the data units on which the inventive cache replacement techniques operates. Many other terms can be used to describe such data units, including lines, blocks, etc.

The basic approach of the present invention is to completely avoid any ranking of documents contained in a set of candidate cached documents. Instead, the present invention decides whether or not to remove a document by comparing an attribute of just that document to an additional threshold or border weight $W_b$. Basing the removal decision on the attributes of single document eliminates any need to form a subset of documents and to rank the documents in the subset before a removal operation can be performed.

The computational complexity of the inventive garbage collection or cache replacement technique is significantly reduced in comparison to existing techniques. No hardware implementation is required and the technique simple enough that its execution in software does not seriously impact overall system performance. The reduced load on the system makes it easier to perform the garbage collection in parallel with other tasks being carried out in the proxy server. It may be possible to perform garbage collection on a continuous basis; that is, in parallel with processor operations concurrently using the cache memory contents. This would be in contrast to prior art cache replacement techniques which impose such heavy loads on a system that the techniques are employed only periodically; for example, when the cache is completely full or is at least filled up to a threshold level.

Figure 4:
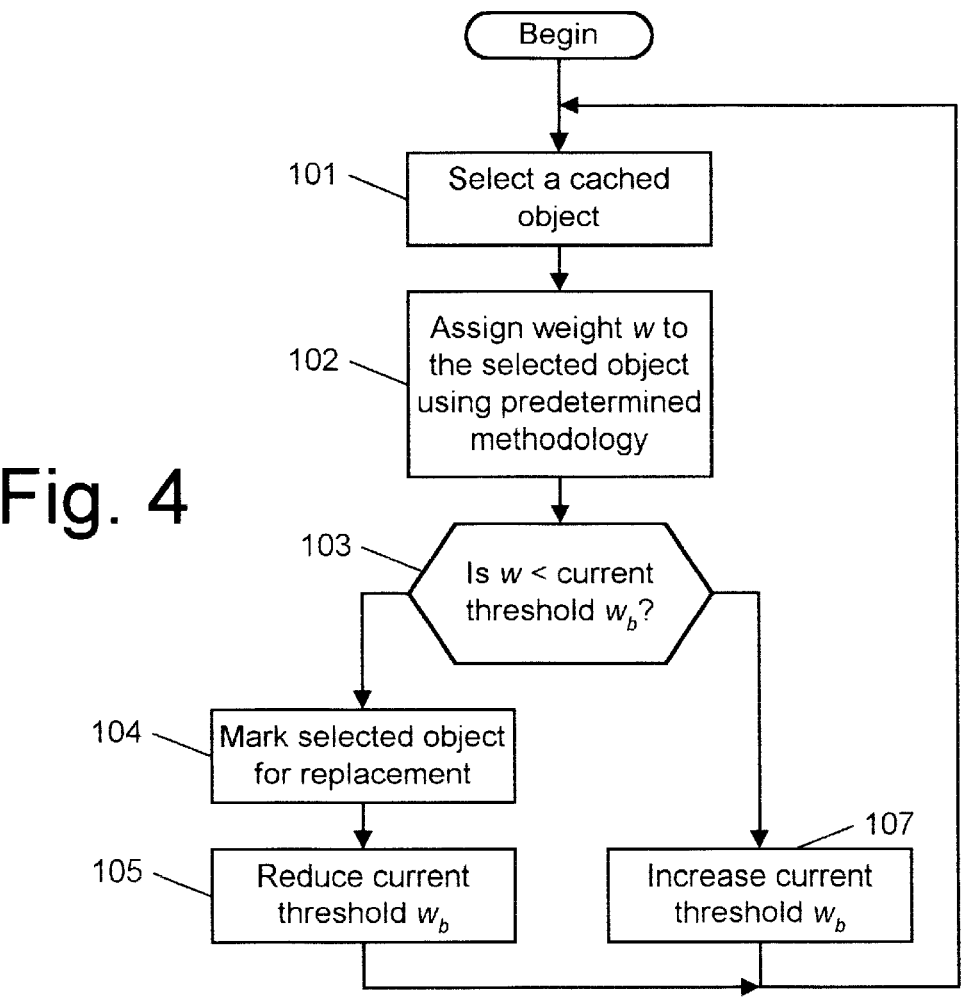
FIG. 4 is a flowchart of steps performed in carrying out the present invention.

FIG. 4 is a flowchart of steps that are performed in carrying out the present invention. In an initial step 101 of the process, a cached document is selected. The document may be selected at random or by using some sort of scheduling algorithm which assures that every document in the cache is selected at least once over a maximum interval of time.

Once an object is selected from the cache, a weight w is assigned to the selected object in step 102. Different methodologies might be used to establish the weight w. For instance, the weight could be based on an assumed probability that the document will be accessed in the future. Alternative object weighting methodologies can be based on factors such as the length of time the document has been stored in the cache memory with newer documents being given higher weight than older ones, the number of times the document has been accessed over a given time interval with more frequently accessed documents being given greater weights, the size of the document with smaller documents being given greater weights and any expiration date included in the document. Clearly, a document which has remained in the cache past an internal expiration date is logically to be given a lower weight than a "fresh" document.

Step 103 compares the assigned object weight to a threshold or border weight $w_b$. The threshold weight $w_b$ is already stored in the cache memory or another suitable memory or register in the proxy server. If step 103 indicates that the assigned object weight w is less than the current threshold $w_b$, the selected object is marked for replacement in step 104. The current threshold $w_b$ is then reduced in a step 105 to reflect the premise that the planned removal of the selected document reduces any immediate need for removal of additional cached documents. If step 103 indicates that the assigned object weight W is greater than the current threshold $w_b$, the selected document is not marked for removal. No action is taken with respect to the document. However, the current threshold $w_b$ is increased in step 107. The increase elevates the chances that the next document or object selected will have an assigned weight less than or equal to the new threshold.

The fact that an object is removed when its assigned weight is equal to the threshold is not considered significant. It is well within the scope of the invention to require that the assigned weight be less than the threshold before the object is removed.

Depending on the environment in which the invention is implemented, it may be desirable to use different paradigms when raising and lowering the threshold value $w_b$ in the course of cache replacement operations. The simplest paradigms would make each increase a small fixed value and each decrease a relatively greater fixed value. More complex paradigms may be suitable for certain environments. Practical experience has shown that the threshold should be lowered more quickly than it is raised. Preferably, the threshold level should be lowered by an increment which is at least five times as great as the increment by which it is raised. For example, if the threshold weight is increased by one unit each time it is raised then it should be reduced by at least five units each time it is lowered. When the invention is used in the proxy server environment, the best results have been achieved when the decrease increment is on the order ten times the increase increment. Of course, the optimal factor depends on the specific system environment to which the invention is applied.

Figure 5:
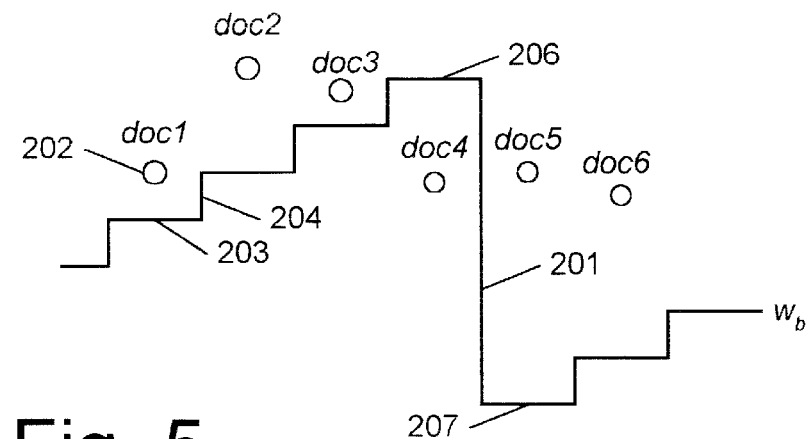
FIG. 5 is a graph used in explaining the operation of the present invention.

FIG. 5 is an example of a sequence of threshold adaptation steps for a sequence of six objects, labeled doc1 through doc6. The small circles, such circle 202, associated with the document legends represent the weights assigned to those documents when each is selected in turn as a possible candidate for removal from a cache. The stepped graph 201 represents changes in the threshold level or boundary weight as a consequence of successive object removal decisions. Because the assigned weight of the first document doc1 is greater than the threshold level 203 in effect at the time, doc1 is left in the cache and the threshold is raised by increment 204. The same situation exists for subsequently considered documents doc2 and doc3, resulting in the threshold level being repeatedly raised in stair step fashion to level 206 before encountering the first document (doc4) having an assigned weight lower than the then current threshold weight. When the assigned weight for doc4 is compared to the then current threshold level 206, doc4 is marked for removal from the cache and the threshold level falls significantly to a new level 207. After the threshold level drops, it begins to rise again in stairstep fashion since the next two documents to be considered, doc5 and doc6, have assigned weights which are greater than the then current threshold levels.

While a preferred embodiment of the invention is described, variations in and modifications to that embodiment may occur to those skilled in the relevant art. Therefore, it is intended that the appended claims shall be construed to include both the preferred embodiment and all variations and modifications as fall within the true spirit and scope of the invention.

What is claimed is:

1. A cache memory management method comprising the steps of:
   selecting a single object from the cache;
   assigning an object weight to the selected object;
   comparing the assigned object weight to an existing threshold weight;
   if the assigned object weight is lower than the existing threshold weight, marking the selected object for removal from the cache and lowering the value of the threshold weight; and
   if the assigned weight is greater than the existing threshold weight, raising the value of the threshold weight;
   wherein the threshold weight is raised by increments different than the increments by which it is lowered.

2. A cache memory management method as set forth in claim 1 wherein the single object is selected at random from the set of objects stored in the cache.

3. A cache memory management method as set forth in claim 1 wherein the single object is selected using a defined selection schedule.

4. A cache memory management method as set forth in claim 1 wherein the incremental change in the threshold weight when the threshold is being lowered is at least five times as great as the incremental change in the threshold weight when the threshold is being raised.

5. A cache memory management system comprising:
   object selection logic for selecting a candidate object from cache memory;
   object weighting logic for assigning an object weight to the selected object;
   comparison logic for comparing the assigned object weight to a current threshold weight; and
   management logic for:
      if the assigned object weight is lower than the current threshold weight, marking the selected object for removal from the cache and lowering the threshold weight, and
      if the assigned object weight is greater than the current threshold weight, raising the threshold weight;
   wherein the management logic lowers the threshold weight at a different rate than it raises the threshold weight.

6. A cache memory management system as set forth in claim 1 wherein the management logic lowers the threshold weight in increments greater than the increments used in raising the threshold weight.

7. A program product comprising a computer useable medium having a computer readable program embodied in said medium wherein the computer readable program when executed by a computer causes the computer to:
   select a single object from a cache memory;
   assign a weight to the selected object;
   compare the assigned weight to an existing threshold weight;
   if the assigned weight is lower than the existing threshold weight, mark the selected object for removal from the cache and lower the value of the threshold weight; and
   if the assigned weight is greater than the existing threshold weight raise the value of the threshold weight;
   wherein the threshold weight is raised by increments different than the increments by which it is lowered.

8. A program product as set forth in claim 7 wherein the single object is selected from cache memory at random.

9. A program product as set forth in claim 7 wherein the single object is selected from cache memory in accordance with a defined selection schedule.

* * * * *